A. J. DIBBLE.
Butter-Workers.

No. 148,191. Patented March 3, 1874.

WITNESSES:
A. W. Almqvist
C. Sedgwick

INVENTOR:
A. J. Dibble
BY
[signature]
ATTORNEYS.

UNITED STATES PATENT OFFICE.

ANDREW JACKSON DIBBLE, OF FRANKLIN, NEW YORK.

IMPROVEMENT IN BUTTER-WORKERS.

Specification forming part of Letters Patent No. 148,191, dated March 3, 1874; application filed November 22, 1873.

*To all whom it may concern:*

Be it known that I, ANDREW J. DIBBLE, of Franklin, in the county of Delaware and State of New York, have invented a new and Improved Combined Butter-Worker, Salt-Grinder, and Weigher, of which the following is a specification:

The invention will first be fully described, and then pointed out in the claims.

Figure 1:
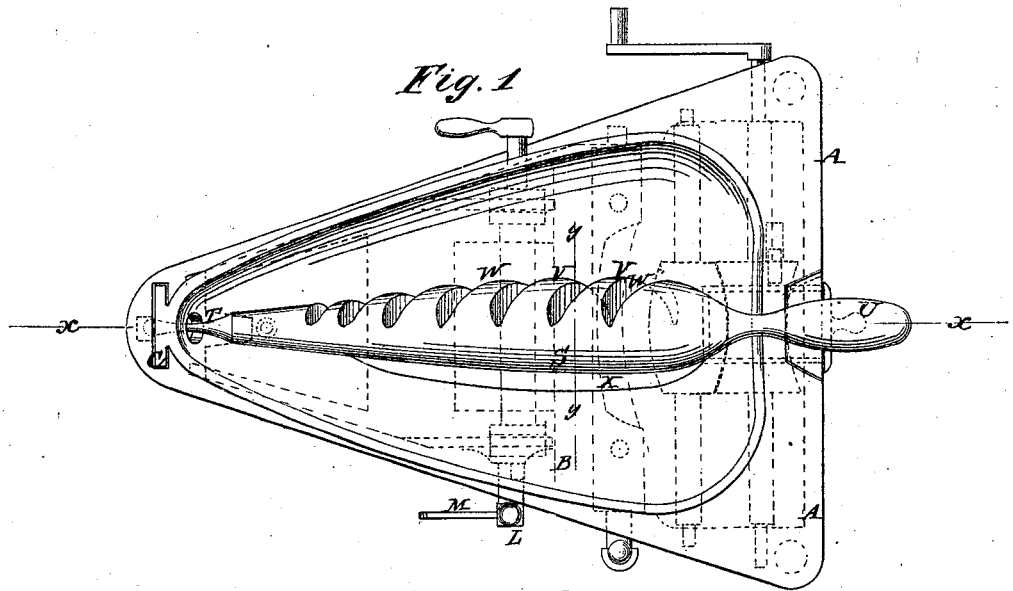
Figure 2:
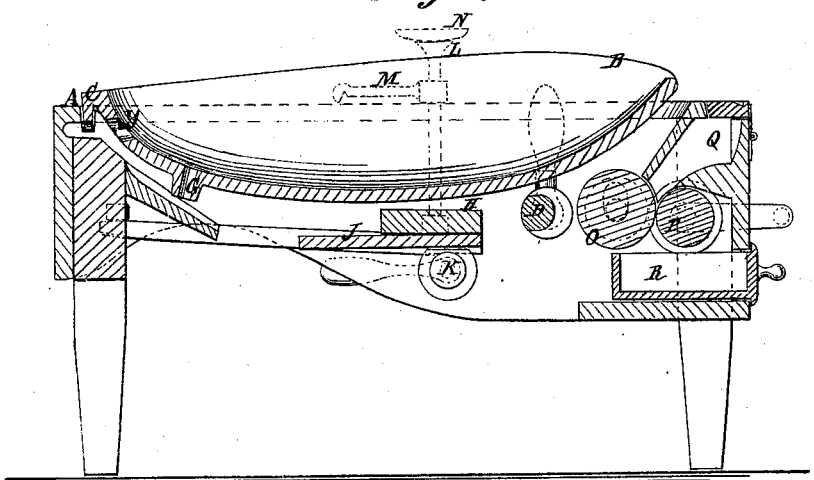
Figure 3:
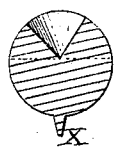

Figure 1 is a plan view of my improved machine. Fig. 2 is a longitudinal sectional elevation taken on the line $x\ x$ of Fig. 1. Fig. 3 is a cross-section of the butter-working implement, taken on the line $y\ y$, Fig. 1; and Fig. 4 is a section, showing a modification of a part of said implement.

A represents a stand of triangular form in plan, with corners slightly rounded, and with an open top, in which the butter-working bowl B, of the same form, rests, said bowl having a hook-like projection, C, at the small end, projecting down into a notch in the top of the stand, to hold the bowl from being displaced by a revolving lifter-shaft, D, arranged under the bowl near the front end, for raising it up thereat to make the requisite descent toward the escape-passage G for the buttermilk, under which is a spout to conduct the milk away. The bowl might be permanently fixed at the proper inclination for the milk to run off; but in order to shift it onto a scale, H, for weighing the butter, and because it is necessary to rest level on the scale, it is desirable to have the lifter, so that the bowl can be let down level on the scale; but it is also desirable to have it sit level during some operations of the process of working the butter. The scale is mounted on a platform, J, which is capable of rising and falling, and an eccentric lever, K, is placed under it to raise it up so as to take the bowl up on it. Any platform-scale will do; but I prefer to have one with a little extension, L, above the connection with the beam M, suitable for holding a salt-basin, N, for weighing out salt to mix with the butter. Both of the lifting-shafts are provided with a handle or crank for turning them. Within the case, at the front end, I have arranged a pair of salt-crushing rollers, O P, with a hopper, Q, above, for feeding the salt, and a receptacle, R, for receiving the crushed salt. One of the rollers has a hand-crank for turning it. This grinding attachment is calculated to save much labor now spent in preparing the salt by crushing it on a table or board by a rolling-pin.

The butter-working implement consists of the cigar-shaped piece S, of hard wood, with an elongated pivot-pin, T, at one end, a handle, U, at the other end, the oblique transverse blades V on one side formed by notches W, made in the body of the implement, and the longitudinal sword or blade X. The pivot-pin is entered in a hole, G, at the lower end of the bowl, for a fulcrum, and is manipulated at the other end by the operator in all suitable ways for pressing, cutting, spreading, and gathering the butter by the blades V and X. The blades U are arranged obliquely to the body of the working implement, to shape the cuts or indentations so as to incline and descend toward the escape-passage, so that the milk will escape freely.

Figure 4:
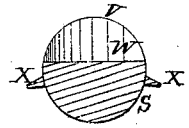

The longitudinal blade or sword X is, in the example, arranged opposite the side having the blades V; but it may be arranged close to them on one side or the other, or two blades may be employed, as represented in Fig. 4, having a smooth space between them for packing and smoothing the butter down, when required.

The bowl may be made of wood or iron. If the latter, it will, by preference, be lined with porcelain.

The rollers for grinding the salt will be of wood, cement, or other non-corrosive material, but should not be of iron, as the salt would corrode them.

Having thus described my invention, I claim as new and desire to secure by Letters Patent—

1. The combination, with top-open stand A, of the up-and-down-movable bowl B, having projection C fitting into notch of stand, as and for the purpose described.

2. The butter-worker U S, provided with the longitudinal blade X X and transverse notches W, as set forth, and for the purpose specified.

3. The combination of the butter-bowl B and the butter-worker S, the latter pivoted, by a pin, T, at one end of the former, as and for the purpose specified.

ANDREW JACKSON DIBBLE.

Witnesses:
 WALTER HANFORD,
 WM. B. HANFORD.